US008931281B2

(12) United States Patent
Ruberte Sanchez et al.

(10) Patent No.: US 8,931,281 B2
(45) Date of Patent: Jan. 13, 2015

(54) EXTERNAL FLAP RETAINING MECHANISM (75) Inventors: Jose E. Ruberte Sanchez, Jupiter, FL (US); David C. Schuppert, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 608 days.

(21) Appl. No.: 12/794,816

(22) Filed: Jun. 7, 2010

(65) Prior Publication Data

US 2011/0297758 A1   Dec. 8, 2011

(51) Int. Cl.
*F02K 1/06* (2006.01)
*F02K 1/12* (2006.01)
*F02K 1/80* (2006.01)

(52) U.S. Cl.
CPC .............. *F02K 1/12* (2013.01); *F05D 2250/40* (2013.01); *F05D 2260/50* (2013.01)
USPC ........... 60/771; 60/232; 239/265.39; 403/319

(58) Field of Classification Search
USPC ............ 60/770, 771, 226.1–226.3, 230, 232; 239/265.33–265.39; 403/315–319, 403/359.6, DIG. 7
See application file for complete search history.

(56) References Cited

U.S. PATENT DOCUMENTS

| 1,328,064 | A | * | 1/1920 | Vasselli ........................ 384/424 |
| 2,846,844 | A |   | 8/1958 | O'Rourke |
| 2,976,676 | A | * | 3/1961 | Kress .......................... 239/127.3 |
| 3,004,385 | A |   | 10/1961 | Spears, Jr. et al. |
| 3,044,258 | A | * | 7/1962 | Carlton et al. ............. 239/127.3 |
| 3,091,080 | A |   | 5/1963 | Crim et al. |
| 3,592,389 | A |   | 7/1971 | Johnson |
| 3,792,815 | A |   | 2/1974 | Swavely et al. |
| 3,794,244 | A |   | 2/1974 | McMath |
| 3,954,225 | A |   | 5/1976 | Camboulives et al. |
| 4,128,208 | A |   | 12/1978 | Ryan et al. |
| 4,176,792 | A |   | 12/1979 | McCardle, Jr. |
| 4,181,260 | A |   | 1/1980 | Nash |
| 4,245,787 | A |   | 1/1981 | Freid |
| 4,262,868 | A |   | 4/1981 | Dean |
| 4,274,593 | A |   | 6/1981 | Joubert |
| 4,363,445 | A |   | 12/1982 | Bouiller et al. |
| 4,440,346 | A |   | 4/1984 | Wiley |
| 4,440,347 | A |   | 4/1984 | Madden et al. |
| 4,447,009 | A |   | 5/1984 | Wiley et al. |
| 4,456,178 | A |   | 6/1984 | Jones et al. |
| 4,730,952 | A | * | 3/1988 | Wiley ........................... 403/316 |
| 4,767,055 | A |   | 8/1988 | Ward |
| 4,803,756 | A |   | 2/1989 | Hufnagel |
| 4,884,748 | A |   | 12/1989 | Ward et al. |
| 4,994,660 | A |   | 2/1991 | Hauer |
| 5,031,836 | A | * | 7/1991 | Ward ........................ 239/265.19 |
| 5,048,996 | A | * | 9/1991 | DuBois et al. ................ 403/287 |
| 5,082,182 | A | * | 1/1992 | Bruchez et al. ........... 239/265.35 |

(Continued)

FOREIGN PATENT DOCUMENTS

WO   03/013956 A1   2/2003

*Primary Examiner* — Andrew Nguyen
(74) *Attorney, Agent, or Firm* — Carlson, Gaskey & Olds, P.C.

(57) ABSTRACT

An external flap connection assembly for a turbine engine nozzle has a track frame, a slider track, and an external flap. The external flap is removably connected to the slider track via a retaining member which has a slider block.

20 Claims, 7 Drawing Sheets

(56) References Cited

U.S. PATENT DOCUMENTS

| | | |
|---|---|---|
| 5,261,605 A | 11/1993 | McLadderty et al. |
| 5,437,411 A | 8/1995 | Renggli |
| 5,666,012 A | 9/1997 | Gongwer |
| 7,179,011 B1 * | 2/2007 | Cohen ........................... 403/315 |
| 2008/0190095 A1 | 8/2008 | Baran |
| 2009/0266912 A1 | 10/2009 | Gukeisen |

* cited by examiner

EXTERNAL FLAP RETAINING MECHANISM

STATEMENT REGARDING FEDERALLY SPONSORED RESEARCH OR DEVELOPMENT

This invention was made with government support under Contract No. N00019-02-C-3003 awarded by the United States Navy. The Government has certain rights in this invention.

BACKGROUND OF THE INVENTION

The present disclosure is related to gas turbine engines, and particularly to external flaps for a gas turbine engine nozzle.

Gas turbine engine nozzles include external flap assemblies which are opened or closed in order to vary the area of the nozzle opening. When the flaps are closed, the nozzle area is restricted, resulting in a smaller opening and greater thrust. When the flaps are opened, the nozzle is less restricted resulting in larger opening and less thrust. Multiple flaps are arranged in a circumferential manner around the nozzle opening, thereby allowing for a greater control over the size of the nozzle opening and the amount of thrust generated.

Opening and closing mechanisms are relatively heavy, and can raise design concerns required to avoid interference with other aircraft components. Additionally, known mechanism for connecting the external flaps to the gas turbine engine body cause disconnecting the external flap from the turbine engine to be difficult. This can result in more expensive repairs and longer repair times, should an external flap need to be replaced.

SUMMARY OF THE INVENTION

Disclosed is an external flap connection assembly for a turbine engine nozzle which has a slider track and an external flap. The external flap has an external flap arm with a retaining member including a protruding slider block. The slider block is received in the slider track.

Also disclosed is a retaining mechanism for connecting an external flap to an engine nozzle. The external flap has a support arm with a retaining member. The retaining member has a retainer slot and a cavity. A retainer piece is received in the retainer slot. A slider block has a first end received in the cavity, and is held in place by the retainer piece.

Also disclosed is an external flap for a turbine engine nozzle. The external flap has at least one support arm with a retaining mechanism for connecting the external flap to a turbine engine body. The retaining mechanism has a retainer slot and a cavity. A slider block is received in the cavity and a retainer piece is received in the retainer slot, thereby holding the slider block in place.

These and other features of the present invention can be best understood from the following specification and drawings, the following of which is a brief description.

DETAILED DESCRIPTION OF THE PREFERRED EMBODIMENT

Figure 1:
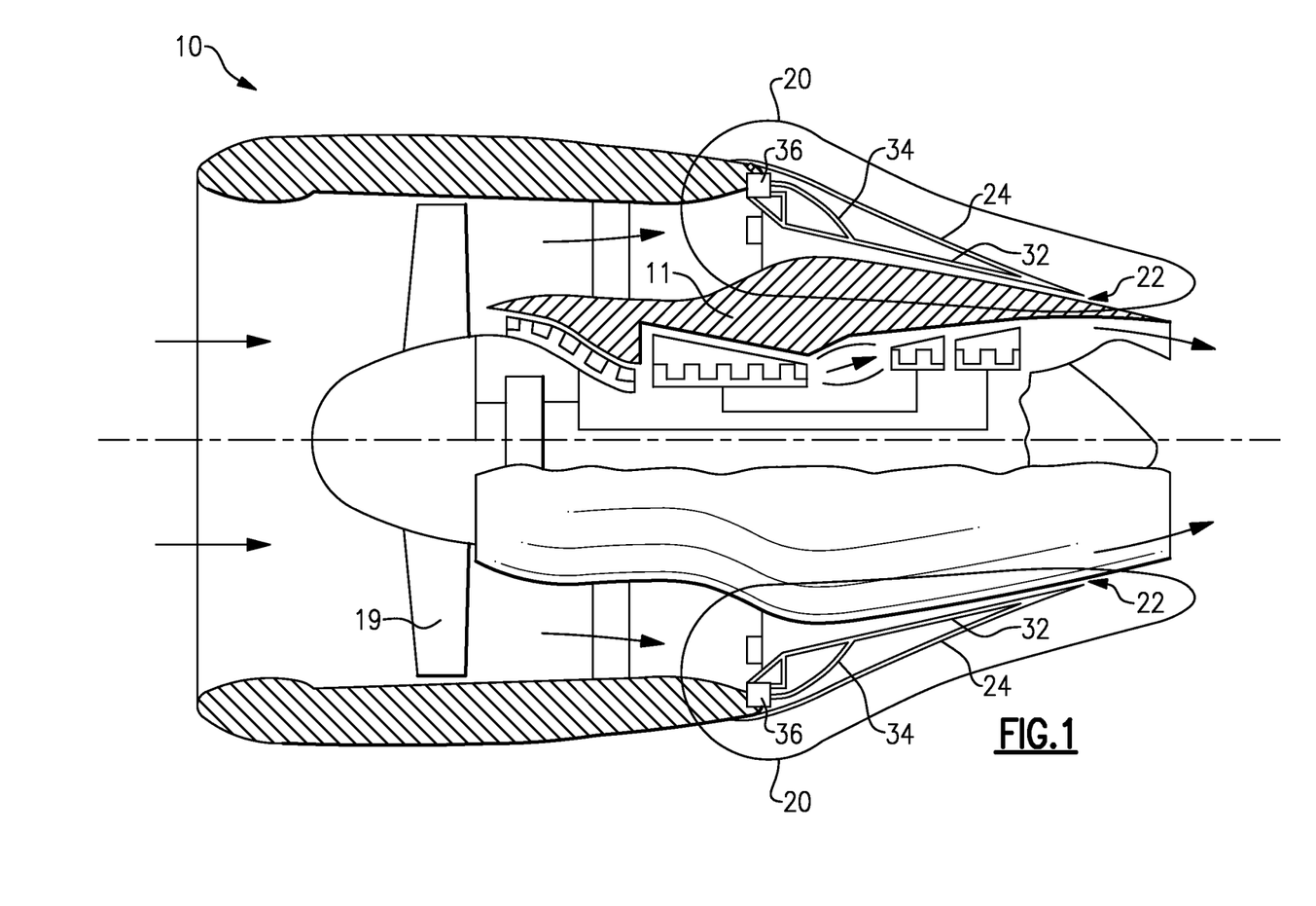
FIG. 1 illustrates a schematic diagram of a gas turbine engine.

FIG. 1 illustrates a schematic diagram of a gas turbine engine 10. The gas turbine engine 10 includes a nozzle 20 which expels air driven by a fan 19, thereby producing thrust. The nozzle 20 defines an opening 22 around a core housing 11. The nozzle 20 is defined by a set of external flaps 24, which are arranged circumferentially around the opening 22. The external flaps 24 are shown schematically in FIG. 1, and can be opened or closed depending on the desired volume of the gas passing through the nozzle 20 and thereby controlling the direction of the thrust of the turbine engine 10. The external flaps 24 are connected to the opening 22 via a retaining mechanism (illustrated in FIGS. 2, 3A, 3B, and 4). The external flaps 24 are further supported by a divergent flap 32 which is mechanically supported by a mode strut 34 and a hinge structure 36, which allows the external flap 24 to move along with the divergent flap 32. The hinge structure 36 can also contain an actuator for controlling the movement of the divergent flap 32.

Figure 2:
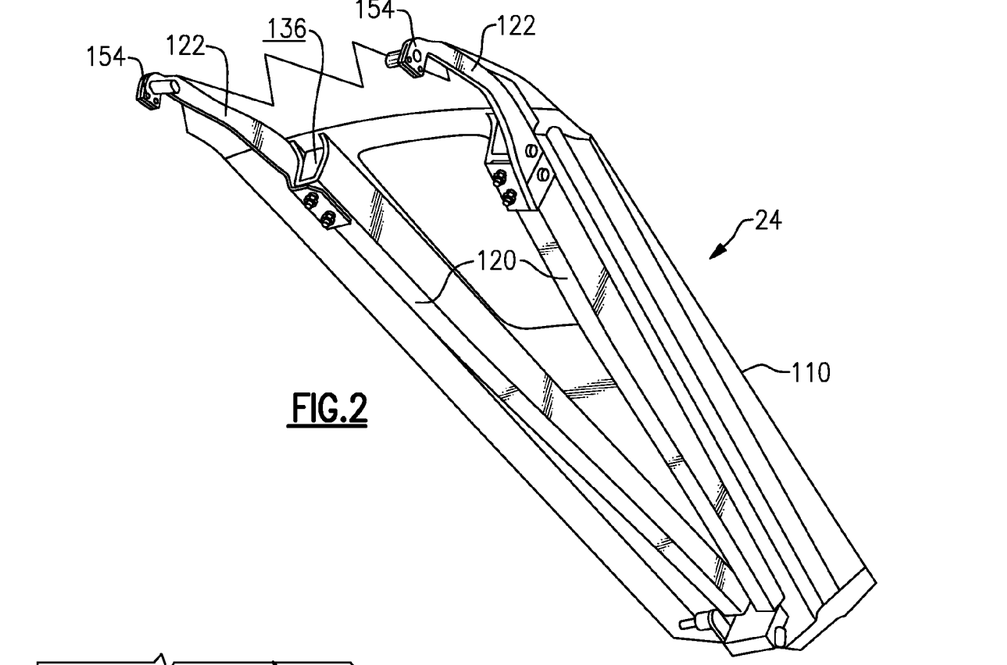
FIG. 2 illustrates an external flap for a gas turbine engine nozzle.

FIG. 2 illustrates a single external flap 24, multiples of which can be used to create the arrangement described above, and illustrated in FIG. 1. The external flap 24 has a flap surface 110 which is supported by two external flap support ribs 120. Each of the external flap support ribs 120 connects to a support arm 122. The support arms 122 each have a retaining member 154 for connecting the support arm 122 to a slider track 420 (illustrated in FIGS. 5A, 5B and 6). The illustrated flap support ribs 120 also include a hollow opening 136 which extends through the flap support ribs 120.

Figure 3A:
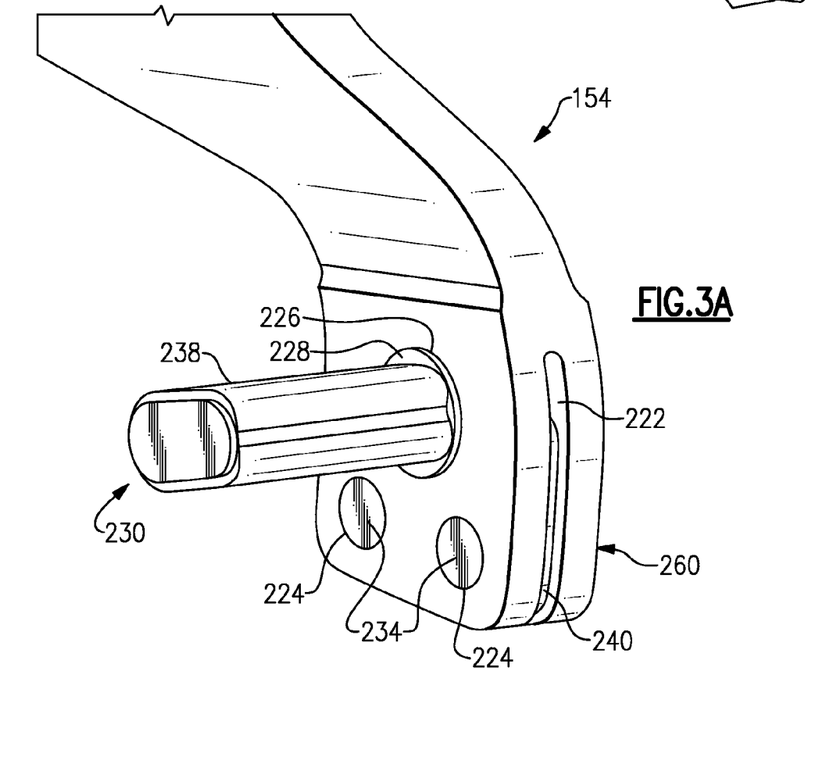
FIG. 3A illustrates an isometric view of a retaining mechanism for connecting an external flap to a gas turbine engine nozzle.
Figure 3B:
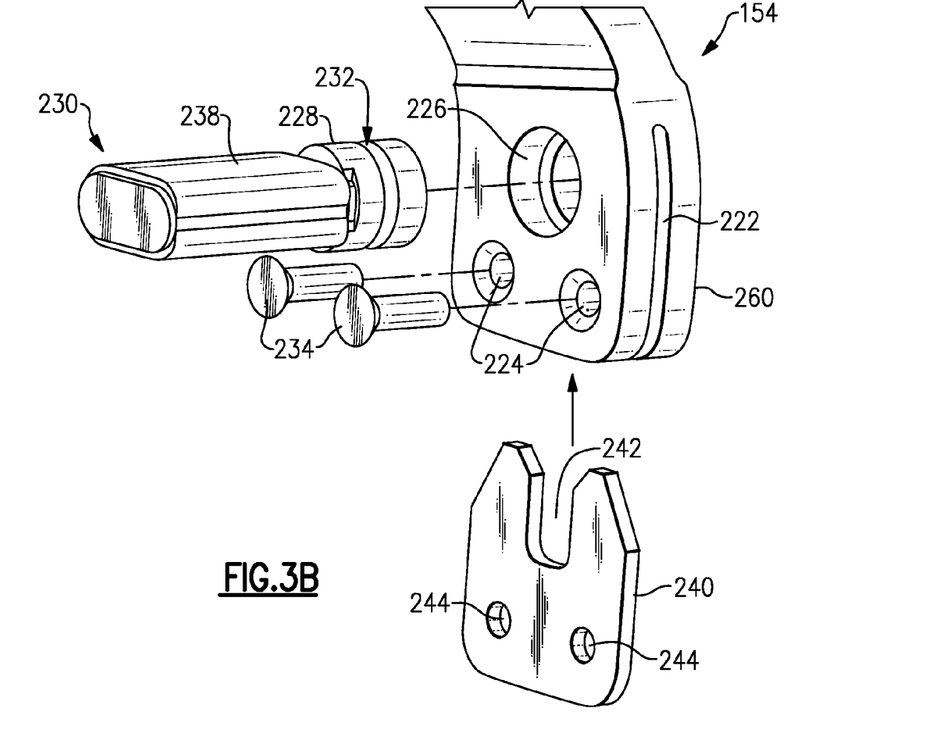
FIG. 3B illustrates an exploded view of the retaining mechanism of FIG. 3A.

The structure of the retaining member 154 is located on the end of each support arm 122, which is shown in greater detail, with an assembled view (FIG. 3A) and an exploded view (FIG. 3B). The retaining member 154 includes a retainer piece slot 222, multiple fastener holes 224, and a cavity 226. Received within the cavity 226 is a rotational bearing 228 portion of a slider block 230. The rotational bearing 228 portion of the slider block 230 includes a circumferential channel 232 (FIG. 3B). While the opening 222 is referred to as a retainer piece slot 222, it could alternately be any shape designed to accommodate a retainer piece 240.

A retainer piece 240 is received in the retainer piece slot 222 and has a slot 242 corresponding to the cavity 226 and through holes 244 corresponding to each of the fastener holes 224. The rotational bearing 228 of the slider block 230 is received in the cavity 226. The slot 242 in the retaining piece 240 fits into the circumferential channel 232 of the rotational bearing 228, thereby holding the slider block 230 in place axially while allowing for rotation of the rotational bearing 228. Received within each of the fastener holes 224 of the retaining member 154 and the through holes 244 of the retaining piece 240 is a fastener 234 (such as a rivet or a bolt), which holds the retaining piece 240 in place. Each of the illustrated fastener holes 224 is a counter-sunk hole. By counter-sinking the fastener holes 224, the head end and tail end of the fasteners 234 are flush with the outside and inside surfaces of the retaining member 154 thereby preventing any interference issues once the external flap 24 is installed. While an arrangement using releasable mechanical fasteners to hold the retainer piece 240 in place is described above, alternative configurations, such as permanent or adhesive fasteners, could be utilized in place of the described configuration.

Figure 4:
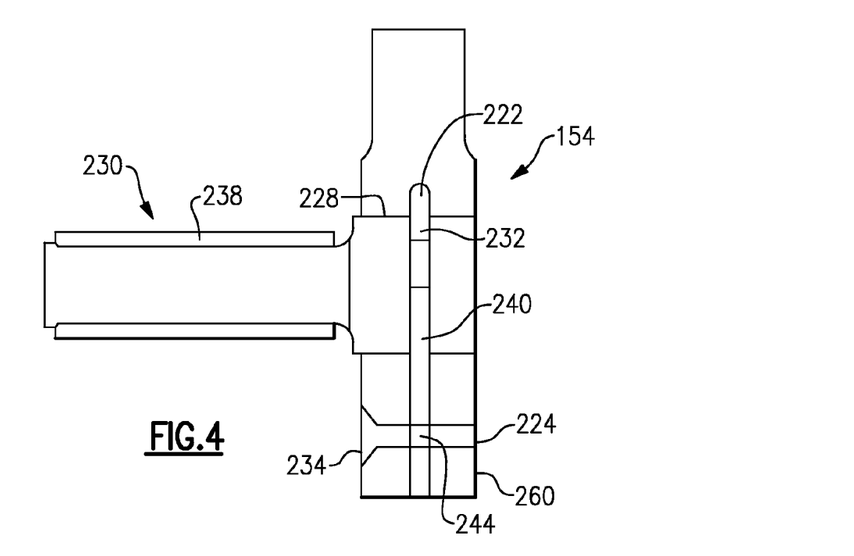
FIG. 4 illustrates a cut out side view of the retaining mechanism of FIG. 3A.

A cutout side view of the retaining member 154 is illustrated in FIG. 4. As described above, the retaining piece 240 is located in the retainer piece slot 222 of the retaining member 154 and fits into the circumferential channel 232 of the rotational bearing 228. The ends of the fasteners 234 and the rotational bearing 228 are flush with an outside surface 260 of the retaining member 154, thereby allowing the support arm 122 and the retaining member 154 to slide in a slider track 420 (illustrated in FIGS. 5A and 5B) without causing interference or clearance issues between the slider track 420, a track frame 410, and the outside surface 260 of the retaining member 154.

Figure 5A:
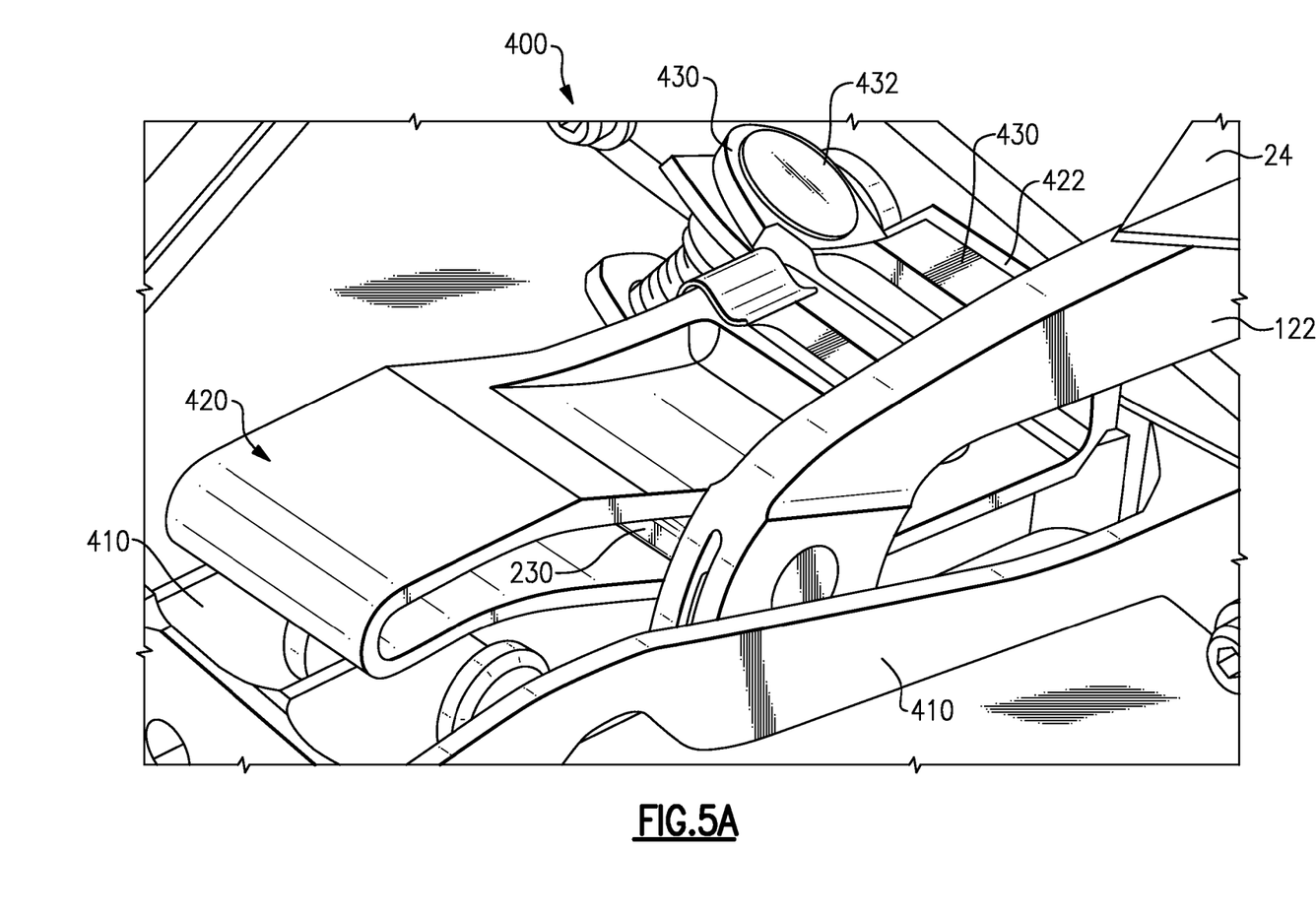
FIG. 5A illustrates a retaining mechanism connected to a slider track on a gas turbine engine nozzle in a partially extended position.
Figure 5B:
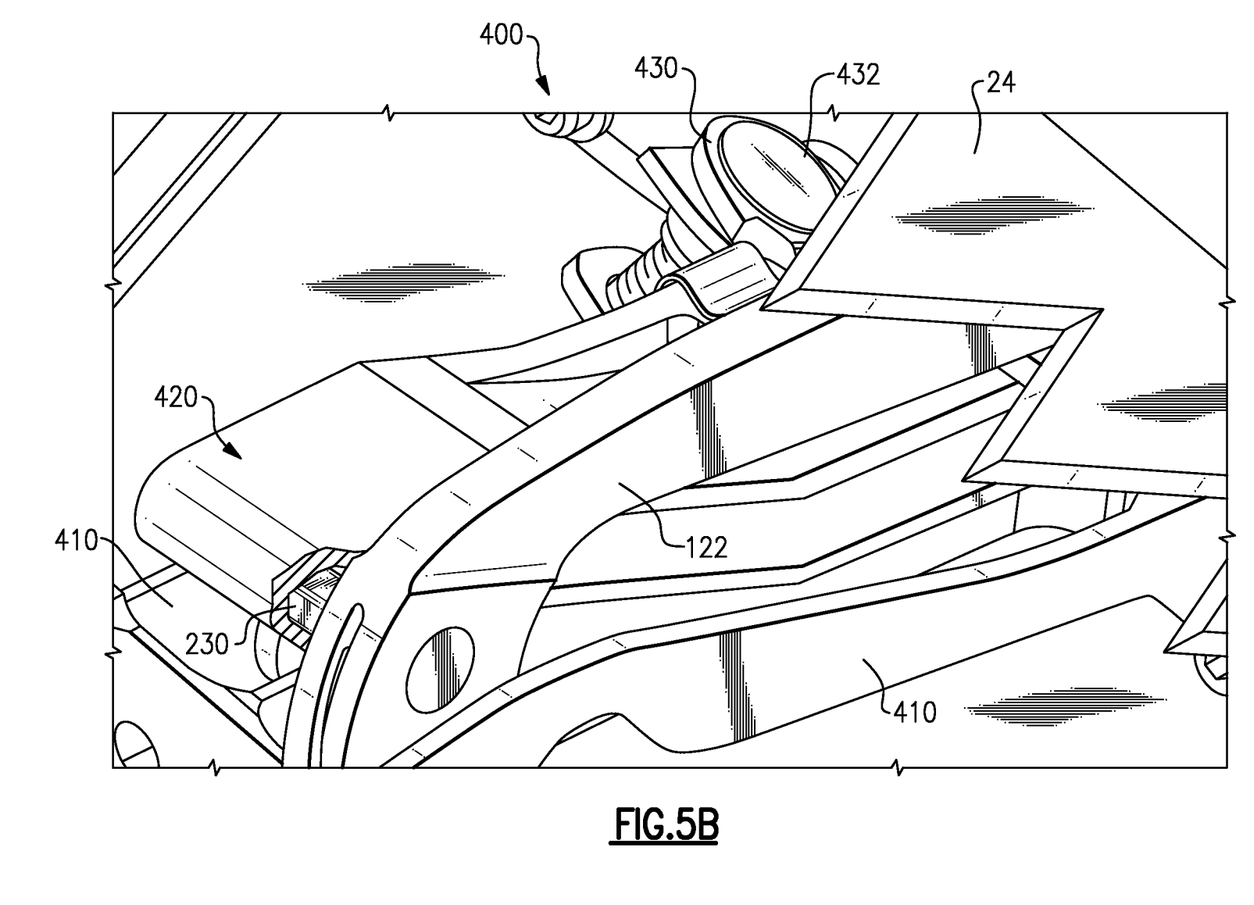
FIG. 5B illustrates the retaining mechanism of FIG. 5 with the external flap in a fully retracted position.

FIGS. 5A and 5B illustrates a connection assembly for connecting the external flap arms 122 to the gas turbine engine 10 nozzle (illustrated in FIG. 1). FIGS. 5A and 5B illustrate the retaining mechanism in a partially closed (FIG. 5A) and an open (FIG. 5B) position. While in the retracted position, the nozzle opening 22 (illustrated in FIG. 1) is larger, thereby reducing the pressure of the exhaust gas and decreasing thrust. The converse is true when the external flap 24 is extended.

The connection assembly has a track frame 410, a slider track 420, and a locking assembly 430. The slider track 420 and the track frame are located on the downstream end of the cowling, thereby connecting the external flap 24 to the cowling. The retaining member 154 is connected to the slider track 420 via a slider portion 238 (illustrated in FIGS. 3A, 3B, and 4) of the slider block 230, which extends into the slider track 420, and is capable of sliding along the slider track 420. As can be seen in FIGS. 5A and 5B, the slider block 230 slides along the slider track 420, and thereby adjusts the positioning of the external flap 24 and the size of the opening 22. The position of the external flap 24 may be adjusted by adjusting the positions of the convergent and divergent flaps 32 (illustrated in FIG. 1), which drag the external flaps 24 along with them as they are adjusted. Alternately, any other movement creating device may be utilized to adjust the external flap 24 positions.

Figure 5C:
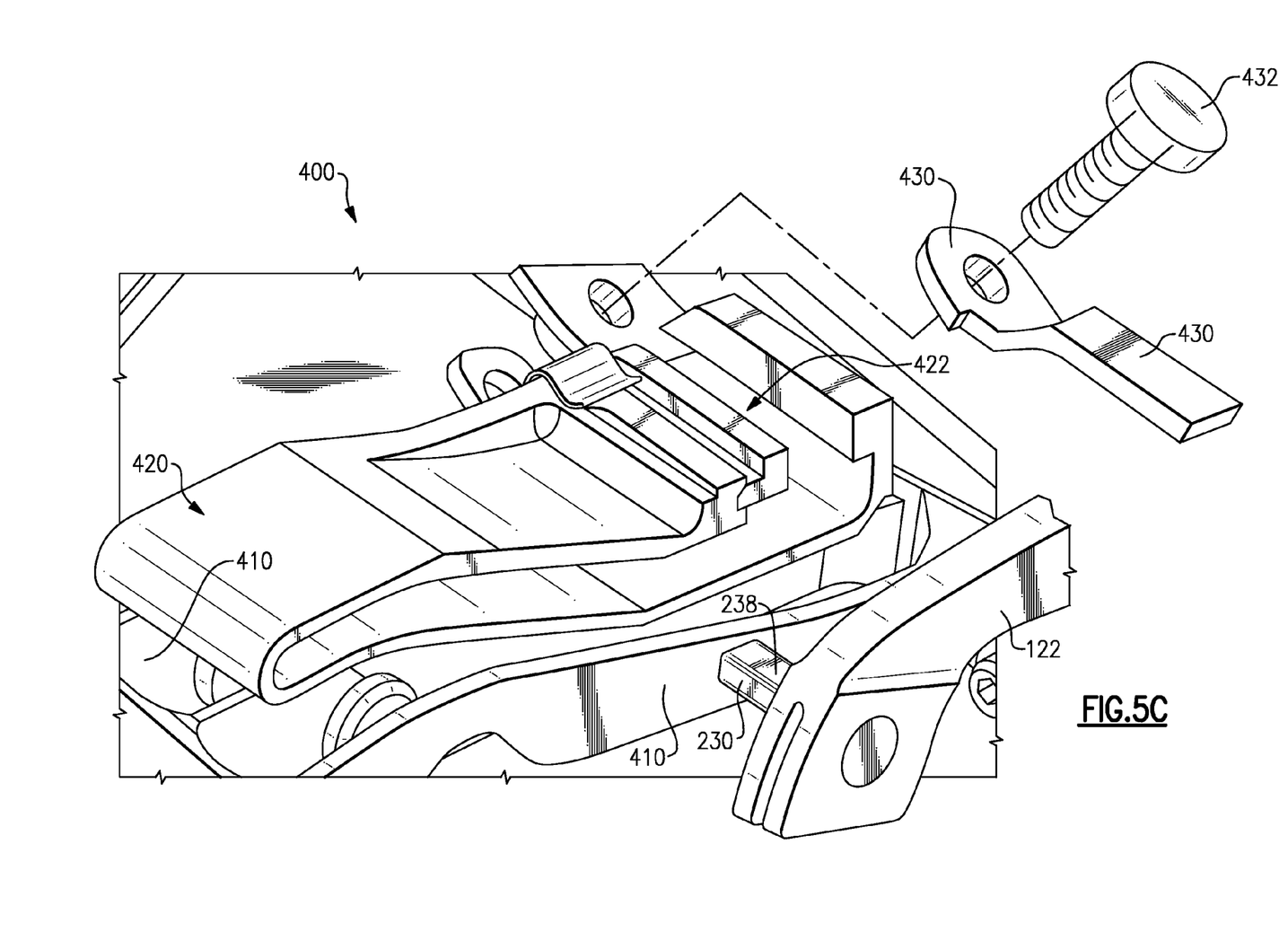
FIG. 5C illustrates an exploded view of the assembly of FIG. 5.

FIG. 5C illustrates an exploded view of the retaining mechanism 400 assembly of FIGS. 5A and 5B. The slider track 420 has an opening 422 at one end which is blocked by a sliding locking mechanism 430. The opening 422 allows the external flap 24 to be attached to the turbine engine 10 via the retaining mechanism 154. The sliding locking mechanism 430 prevents the slider portion 238 of the slider block 230 from slipping out of the slider track 420 when the external flap 24 is installed and is in a fully extended position. The locking mechanism 430 is held in place via a bolt 432 connecting the locking mechanism 430 to the slider track 420. Alternatively, any other removable fastener could be used in place of the bolt 432 to achieve the same affect.

The external flap 24 can be removed from the turbine engine 10 by removing the bolt 432 and sliding the locking mechanism 430 out of a locked position, thereby unblocking the opening 422 in the slider track 420. Once the locking mechanism 430 has been moved, the slider portion 238 of the slider block 230 can be removed from the slider track 420, separating the external flap 24 from the gas turbine engine 10. This configuration allows for easy replacement of damaged or worn external flaps 24. When the external flap 24 has been replaced with a new or repaired external flap 24, the locking mechanism 430 is again bolted to the slider track 420 and the new external flap 24 is locked in.

Figure 6:
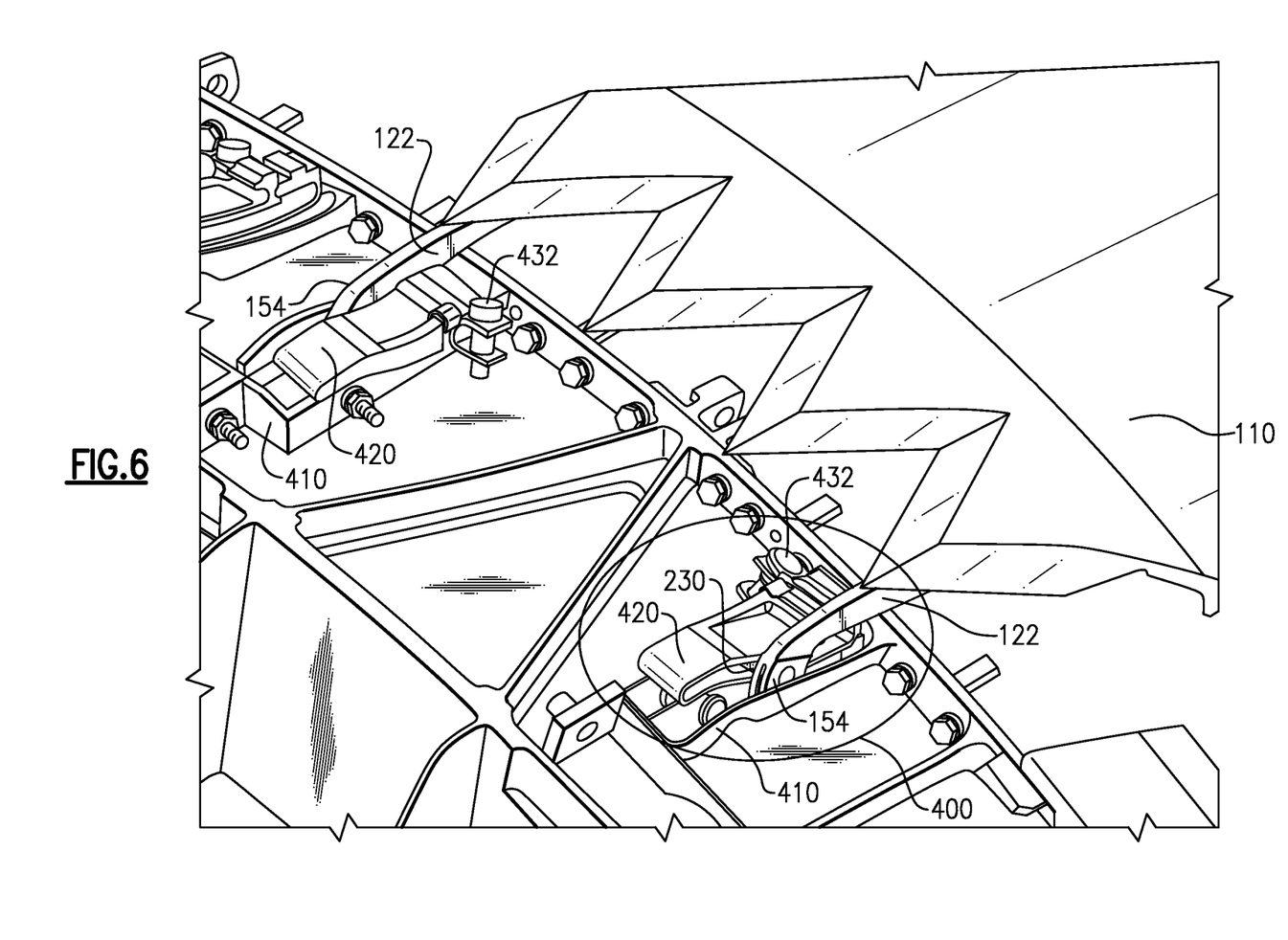
FIG. 6 illustrates an external flap connected to a gas turbine engine via a pair of facing retaining mechanisms.

FIG. 6 illustrates an expanded view of the assembly of FIGS. 5A-5C. The external flap 24 has two support arms 122, each of which is connected to a slider track 420. Each support arm 122 has a retaining member 154 with a slider block portion 230 extending inwardly toward the opposite retaining member 154. Alternately, the slider tracks 420 could be arranged such that the slider blocks 230 extend away from each other, or in any other suitable configuration. Each of the slider track assemblies is arranged in a configuration similar to the configuration illustrated in FIGS. 5A-5C.

While the retaining mechanism and slider track assembly is described with regards to a variable nozzle system, it is understood that the system could be utilized in a thrust vectoring system with minimal modifications.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An external flap connection assembly for a turbine engine nozzle comprising;
   a slider track; and
   an external flap having a retaining member including a protruding slider block, wherein said slider block comprises a rotational bearing having a circumferential channel and a slider portion protruding axially away from said rotational bearing and toward said slider track, wherein said slider block is received in said slider track, wherein said external flap is external to an engine such that at least one surface of said external flap is exposed to an ambient atmosphere surrounding said engine; and
   wherein said retaining member comprises a retainer slot, a cavity, and a plurality of retaining member fastener holes, wherein the slider block is received in said cavity, a retainer piece, having a plurality of retainer piece fastener holes, is received in said retainer slot, and a plurality of fasteners are received in said retaining member and retainer piece fastener holes.

2. The external flap connection assembly of claim 1, wherein said slider track comprises an open first end such that said slider block may be removed from said slider track.

3. The external flap connection assembly of claim 2, wherein said open end is blocked by a sliding locking assembly, said sliding locking assembly comprising a barrier portion and a fastener portion locking said barrier portion to said slider track.

4. The external flap connection assembly of claim 1, wherein said retainer piece holds said slider block in place.

5. A retaining mechanism for connecting an external flap to an engine nozzle comprising:
   a support arm of the external flap having a retaining member, said retaining member comprising a retainer slot, a cavity, and a plurality of retaining member fastener holes;
   a retainer piece received in said retainer slot, the retainer piece having a plurality of retainer piece fastener holes;
   a slider block having a first end received in said cavity, and held therein by said retainer piece, wherein the first end comprises a rotational bearing and the rotational bearing is interfaced with said cavity;

wherein said external flap is external to an engine such that at least one surface of said external flap is exposed to an ambient atmosphere surrounding said engine; and a plurality of fasteners are received in said retaining member and retainer piece fastener holes.

6. The retaining mechanism of claim 5, wherein said retainer piece comprises a slider block slot corresponding to said cavity.

7. The retaining mechanism of claim 5, wherein a second end of the slider block comprises a slider portion.

8. The retaining mechanism of claim 7, wherein said rotational bearing comprises a cylindrical portion and a circumferential retainer channel.

9. The retaining mechanism of claim 8, wherein said retainer piece is partially received in said circumferential retainer channel thereby holding said slider block in place.

10. The retaining mechanism of claim 5, further comprising the plurality of fasteners protruding through said retaining member and said retaining piece, thereby fixing said retainer piece in said retainer slot, each fastener having a head surface flush with an inside surface of a connecting end.

11. An external flap for a turbine engine nozzle comprising:
at least one support arm of the external flap having a retaining mechanism for connecting said external flap to a turbine engine body,
said retaining mechanism having a retainer slot, a cavity, and a plurality of retaining member fastener holes;
a slider block comprising a cylindrical bearing component and a slider component extending axially from said cylindrical bearing component, said cylindrical bearing component being at least partially received in said cavity;
a retainer piece received in said retainer slot for engaging and retaining said slider block, wherein the retainer piece includes a plurality of retainer piece fastener holes;
wherein said external flap is external to an engine such that at least one surface of said external flap is exposed to an ambient atmosphere surrounding said engine; and
wherein a plurality of fasteners are received in said retaining member and retainer piece fastener holes.

12. The external flap of claim 11, wherein said cylindrical component comprises a circumferential channel receiving at least a portion of said retainer piece.

13. The external flap of claim 11, wherein said retaining mechanism fastener holes comprises a plurality of first fastener holes, and said retainer piece fastener holes comprises a plurality of second fastener holes corresponding to said plurality of first fastener holes.

14. The external flap of claim 13, wherein the plurality of fasteners is configured such that each fastener is received in one of said first plurality of fastener holes and one of said second plurality of said fastener holes.

15. The external flap of claim 14, wherein each of said fasteners comprises a head surface, which is flush with a retaining mechanism surface.

16. The external flap of claim 11, further comprising a first and a second support arm, each of said support arms having a retaining mechanism for connecting said external flap to a turbine engine body.

17. The external flap of claim 16, wherein each of said first and said second support arms have a retaining mechanism with facing interior surfaces.

18. The external flap connection assembly for a turbine engine nozzle of claim 1, wherein said slider track is a slider track on a downstream end of an engine nozzle cowling.

19. The external flap connection assembly for a turbine engine nozzle of claim 1, wherein said slider block is axially rotatable relative to said retaining member.

20. The external flap connection assembly for a turbine engine nozzle of claim 19, wherein said circumferential channel is stationary relative to said retaining member.

* * * * *